(12) United States Patent
Yoshikawa

(10) Patent No.: US 6,275,289 B1
(45) Date of Patent: Aug. 14, 2001

(54) MONOCHROMATOR

(75) Inventor: Osamu Yoshikawa, Nara (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/556,301

(22) Filed: Apr. 24, 2000

(30) Foreign Application Priority Data

Apr. 27, 1999 (JP) .............................................. H11-120641

(51) Int. Cl.$^7$ ...................................................... G01J 3/18
(52) U.S. Cl. .......................... 356/332; 356/308; 356/334
(58) Field of Search ................................... 356/332, 334, 356/308, 326, 328

(56) References Cited

FOREIGN PATENT DOCUMENTS 11-304587    11/1999   (JP) .

Primary Examiner—F. L. Evans

(74) Attorney, Agent, or Firm—Armstrong, Westerman, Hattori, McLeland & Naughton, LLP

(57) ABSTRACT

In a monochromator including a light dispersing element rotatable about an axis, a linear motor for rotating the light dispersing element around the axis, an encoder for generating a signal representing a rotational position of the light dispersing element, and a linear motor controller for detecting the rotational position of the light dispersing element based on the signal generated by the encoder, the inventive monochromator is characterized in that the signal generated by the encoder has a waveform including no flat portion. That is, the strength of the signal must change if the rotational position of the light dispersing element changes even slightly. Using a linear motor as a driving unit for the light dispersing element, the monochromator of the present invention can rotate the light dispersing element constantly with a stable speed even at high speed. And using such an encoder, the detecting accuracy of the rotational position of the light dispersing element is much improved compared to conventional ones. Thus a spectrophotometer using the inventive monochromator has a better efficiency and accuracy both in the wavelength scanning analysis and in the time course analysis.

12 Claims, 3 Drawing Sheets

MONOCHROMATOR

BACKGROUND OF THE INVENTION

A widely used monochromator for analyzing machines includes: a light dispersing element, such as a diffraction grating, for dispersing light with respect to the wavelength; a driving mechanism for rotating the light dispersing element; a slit for extracting a monochromatic light from the dispersed light; and a light detector for detecting the monochromatic light extracted by the slit and for generating a signal corresponding to the strength of the detected monochromatic light.

In a spectrophotometer using such a monochromator, two analyzing methods are generally available: a wavelength scanning analysis and a time course analysis. While, in the wavelength scanning analysis, the light dispersing element is rotated within a preset angle, the signal from the light detector is sampled and a spectrum of the light within a preset wavelength range (wavelength scanning range) is obtained. Such a wavelength scanning is repeated several times if necessary. In the time course analysis, on the other hand, the light dispersing element is fixed at a certain angular position corresponding to an object wavelength and the change in the strength of the light of the object wavelength with respect to time is measured.

Several types are practically used for the driving mechanism: one using a sine bar mechanism to convert a translational movement into a rotational movement; one using an open loop control with a stepping motor and a reduction gears; one using a closed loop control with a DC (direct current) servo motor, etc. When a diffraction grating is used for the light dispersing element, its rotating range is generally set at 20–30 degrees.

Among the above described three types of the driving mechanisms, the one using a sine bar and the one using a stepping motor have a common drawback that the wavelength scanning requires a long time. Sometimes it takes several tens of seconds for completing a round of wavelength scanning. Further, since in these mechanisms the rotational position of the light dispersing element is not detected, a discrepancy can easily occur between the wavelength of the actually obtained monochromatic light and the object wavelength if the relationship between the control value of the motor and the actual angular position of the motor is once distorted due to, for example, the degenerative change of the driving mechanism with respect to time.

In the DC servo motor mechanism, high speed wavelength scanning is possible and no such discrepancy occurs because the rotational position of the light dispersing element is always detected. But a normally available DC servo motor (or motor of similar kinds) is designed to be rotated continuously (i.e., rotated more than 360 degrees). When such a motor is used to rotate a light dispersing element within a small angular range (i.e., 20–30 degrees as described above), it is difficult to stabilize the rotational speed of the light dispersing element in such a small angular range. In addition to that, the rotational speed is not correctly reproduced if the motor is rotated back and forth repeatedly in such a small angular range.

The inventor of this application has proposed a new monochromator in the Japanese Patent Application No. H10-124167 (Publication No. H11-304587) for solving the above problems, in which the light dispersing element is driven by a mechanism including a liner motor and a position detector (encoder). Owing to the driving mechanism, the efficiency and accuracy of the wavelength scanning analysis of the monochromator is greatly improved. The new driving mechanism has a further advantage that its cost is low compared to conventional mechanisms.

SUMMARY OF THE INVENTION

The monochromator of the above described patent application is aimed at improving the efficiency and accuracy of the wavelength scanning analysis, but not for the time course analysis. An object of the present invention is, therefore, to further improve the efficiency and accuracy of the monochromator using a linear motor for driving the light dispersing element.

A monochromator according to the present invention, includes:
  a light dispersing element rotatable about an axis;
  a linear motor for rotating the light dispersing element around the axis;
  an encoder for generating a signal representing a rotational position of the light dispersing element, the signal having a waveform including no flat portion; and
  a controller for detecting the rotational position of the light dispersing element based on the signal generated by the encoder and for controlling the linear motor.

One feature of the monochromator of the present invention is that the waveform of the signal generated by the encoder includes no flat portion. This means that there is no flat portion in the graph of the signal with the abscissa for the rotational position of the light dispersing element and the ordinate for the strength of the signal. Or it may be said that the strength of the signal must change if the rotational position of the light dispersing element changes even slightly.

Detecting the position of the light dispersing element is of course equal to detecting any member fixedly connected to the light dispersing element. For example, in the following embodiment, the light dispersing element is mounted on a shaft, the shaft is fixed to an end of an arm and the arm is driven by a linear motor. The rotational position of the light dispersing element can be detected anywhere between the light dispersing element and the linear motor, so that the encoder may be placed anywhere between them.

Using a linear motor as a driving unit for the light dispersing element, the monochromator of the present invention can rotate the light dispersing element constantly with a stable speed even at high speed. And using such an encoder as describe above, the detecting accuracy of the rotational position of the light dispersing element is much improved compared to conventional ones. Thus a spectrophotometer using the inventive monochromator has a better efficiency and accuracy both in the wavelength scanning analysis and in the time course analysis.

DETAILED DESCRIPTION OF A PREFERRED EMBODIMENT

Figure 1:
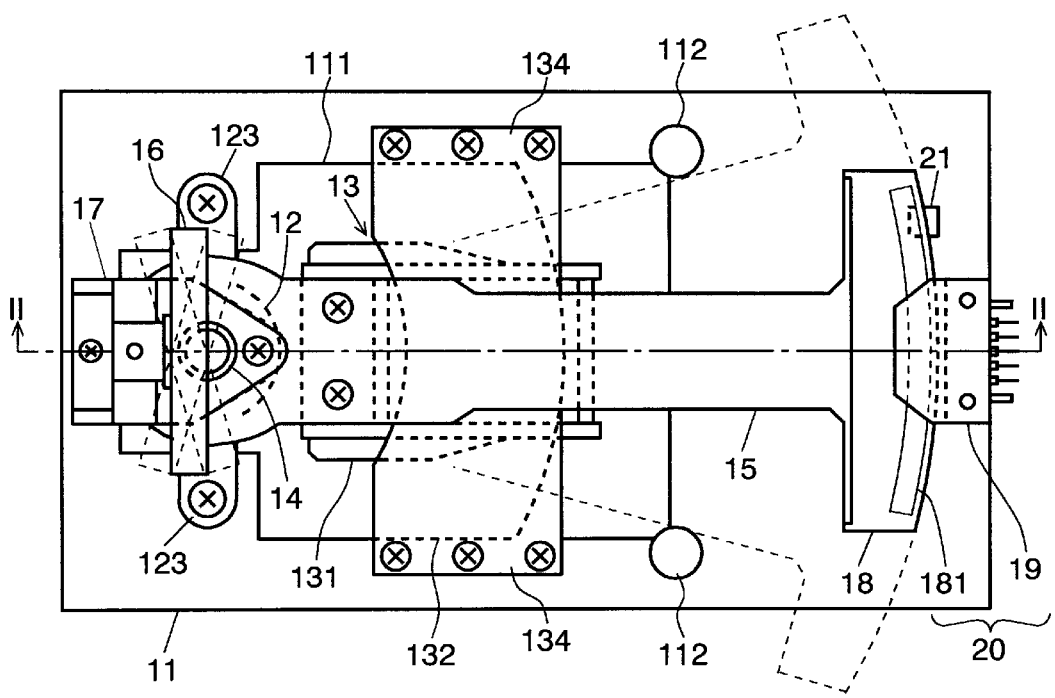
FIG. 1 is a plan view of a monochromator embodying the present invention.
Figure 2:
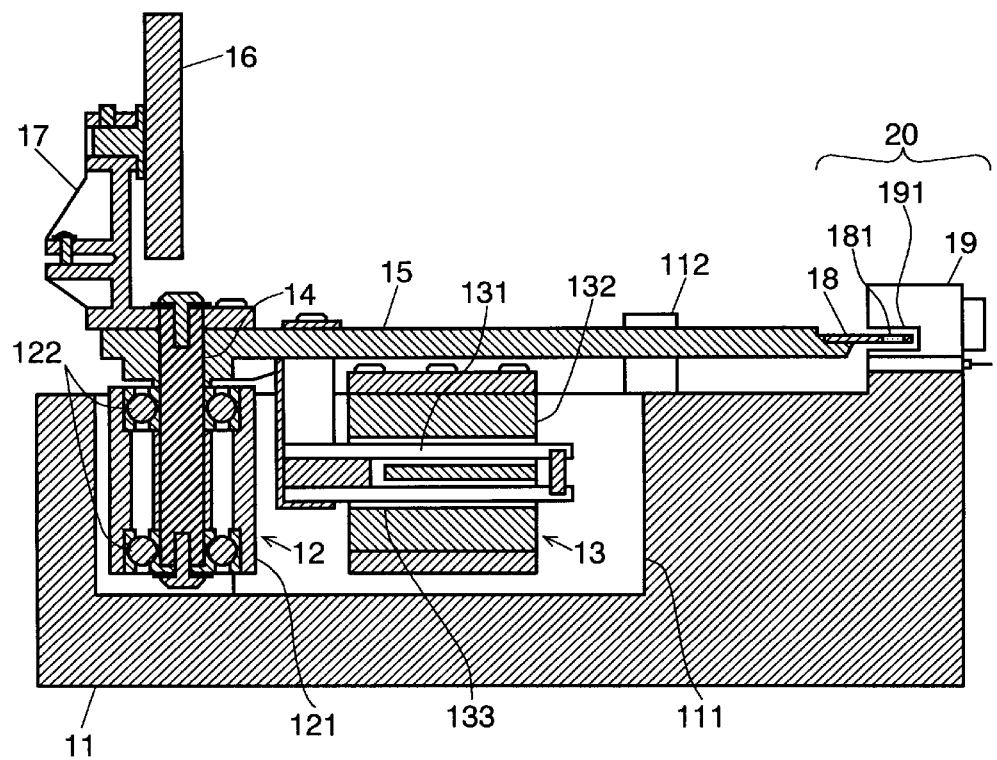
FIG. 2 is a cross-sectional view of the monochromator of FIG. 1 across the line II—II.

A monochromator 10 embodying the present invention is shown in FIGS. 1 and 2. The monochromator has a base 11 with a deep recess 111 in it, in which a bearing unit 12 and a linear motor unit 13 is placed. An arm 15 is supported by the bearing unit 12 which is constructed as a preload bearing with a cylindrical outer case 121 and a pair of ball bearing units 122, 122. At a circular-shaped end of the arm 15 stands an axial shaft 14 which is rotatably supported by the pair of ball bearing units 122, 122. Thus the arm 15 is horizontally rotatable about the central axis of the bearing unit 12. A pair of stoppers 112, 112 stand on the top face of the base 11 for restricting and defining the rotatable range of the arm 15.

From the bottom face of the arm 15 hangs the mobile part 131 of the linear motor unit 13. The mobile part 131 is shaped L in its vertical cross section, and the horizontal portion of the mobile part 131 is inserted in a horizontal slot 133 of the fixed part 132 of the linear motor unit 13 with a contact-free manner. The fixed part 132 of the linear motor unit 13 is fixed to the base 11 with a supporting bridge 134. When a certain electric voltage is applied to the linear motor unit 13, the mobile part 131 is given an electromagnetic force in the horizontal direction. The force is transmitted from the mobile part 131 to the arm 15 giving the axial shaft 14 of the arm 15 a torque to rotate the arm 15 horizontally. When the polarity of the voltage applied to the linear motor unit 13 is reversed, the arm 15 rotates in the opposite direction. The width of the slot 133 (the vertical dimension in FIG. 1) is designed large enough to allow the mobile part 131 to move freely until the arm 15 is stopped by the stoppers 112, 112.

On the top of the circular end of the arm 15 is mounted a grating supporter 17 to which a diffraction grating 16 is fixed. The diffraction grating 16 is fixed so that the center of its surface is on the central axis of the bearing unit 12 or the axial shaft 14, and that the normal of the surface is parallel to the longitudinal axis of the arm 15. When, therefore, the arm 15 rotates as described above, the orientation of the diffraction grating 16 changes accordingly in the horizontal plane. The movable angular range of the diffraction grating 16 is the same as the rotatable range of the arm 15.

On the other end (far end from its rotation axis) of the arm 15 is fixed a head 18 forming a T with the arm 15. The arm 15 and the head 18 may be formed in one body. The outer rim of the head 18 is shaped arc, and an arced code wheel 181 is placed on the head 18. The center of the code wheel 181 lies substantially on the central axis of the axial shaft 14. The rim of the head 18 is inserted in a slit 191 formed in a sensor unit 19 fixed on the base 11.

The code wheel 181 and the sensor unit 19 combined (which is hereinafter referred to as an encoder 20) function a two-phase encoder which generates two series of wave-formed signals whose strength change according to the rotational position of the arm 15. Generally known conventional two-phase encoders generate two signals each composed of a series of rectangular shaped pulses. Such conventional two-phase encoders are composed of a code wheel having a pattern of repeated reflection and transmission and a reflection type or a transmission type photo-sensor. The encoder 20 of the present embodiment, on the other hand, generates signals having a wave-formed pattern (or a non-rectangular pattern) including no flat portion in order to enhance the position detecting accuracy (or the position detecting resolution) of the arm 15.

Figure 3A:
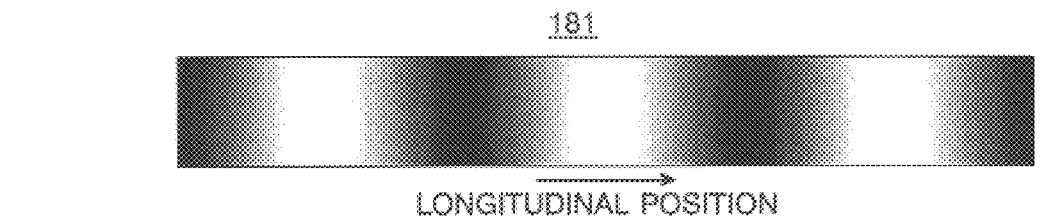
FIG. 3A is an enlarged view of a code wheel.
Figure 3B:
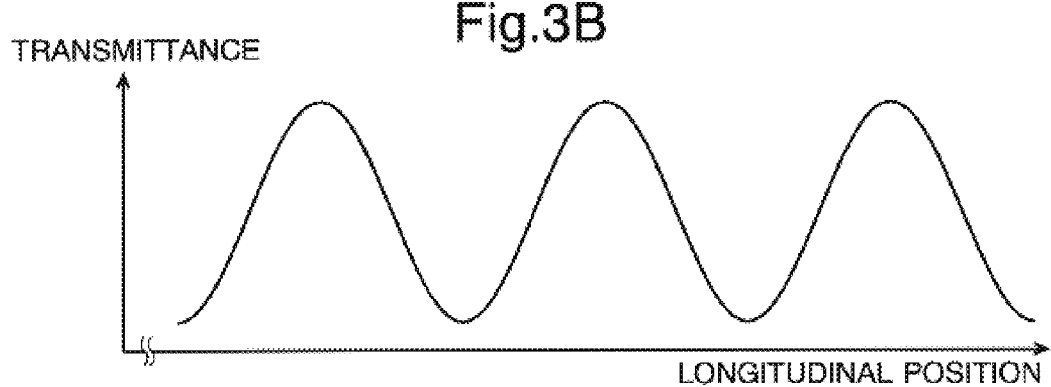
FIG. 3B is a graph showing the relationship between a longitudinal position in the code wheel and the transmittance.

The encoder 20 is described in detail using FIGS. 1–3B. FIG. 3A is an enlarged plan view of the code wheel 181, where, for the convenience of explanation, the arc is extended to be straight. In this example, the code wheel 181 is constructed as a window in which the transmittance of light varies continuously and cyclically with respect to the longitudinal position. Thus the code wheel 181 is hereinafter also referred to as "transmission window". As shown in FIG. 3B, the light transmittance of the transmission window 181 varies sinusoidally with respect to the longitudinal position. Inside of the slit 191 of the sensor unit 19, a light emitting element for casting light to the transmission window 181 and a light receiving element for generating a signal corresponding to the strength of light passing through the transmission window 181 are provided.

Figure 4A:
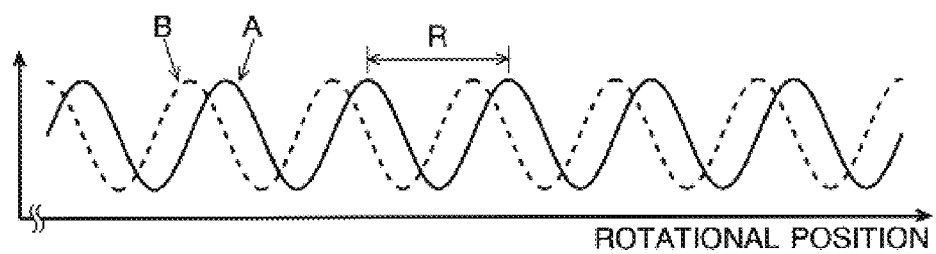
FIG. 4A is a graph of the output signal of the encoder.
Figure 4B:
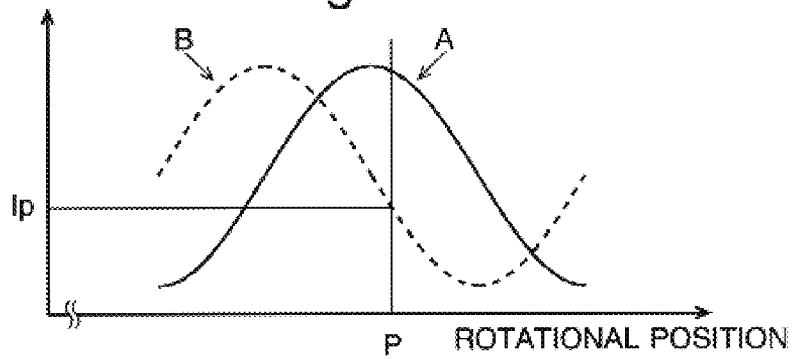
FIG. 4B is an enlarged graph of a portion of the graph of FIG. 4A.

FIG. 4A is a graph of the output signal of the encoder 20, and FIG. 4B shows an enlarged portion of the graph. As shown in these graphs, the encoder 20 generates two signals A and B. Strength of the two signals changes according to the rotational position of the arm 15, but there is a 90 degree difference in the phase of these two signals. From these two sinusoidal signals A and B, one can obtain information about the rotational position and direction of rotation of the arm 15. For example, the rotational position of the arm 15 can be determined based on the number of pulses (or the number of the maximum peaks of the minimum peaks) of the sinusoidal signal generated by the encoder 20 while the arm 15 is rotated from a preset reference position in a certain direction. The determination can be made with the resolution (or the positional accuracy) of R shown in FIG. 4A. The rotational direction of the arm 15 can be known by detecting which of the peak of signal A and the peak of signal B is comes first. The resolution (or the determination accuracy) of the rotational position of the arm 15 can be improved by, in addition to the information of the pulse number, using the information of the phase of the sinusoidal curve (e.g., the phase position from a maximum peak of each signal).

Various methods may be used to determine the reference position for detecting an absolute rotational position of the arm 15. In one of such, the direction of the reflected light (the Raleigh light) is determined as the reference position of the arm 15 when the normal of the surface of the diffraction grating 16 coincides with the incident ray (or the surface of the diffraction grating 16 face the incident ray at right angle). The monochromator 10 of the present embodiment is equipped with an arm detector 21 which generates the arm detecting signal when the arm 15 is at the reference position, by which it is determined whether the arm 15 is at the reference position or not.

It is preferable to use at a certain time point the one of the two signals A and B that has a larger changing rate at the time point in order to improve the accuracy in detecting the rotational position of the arm 15. Suppose, for example, the arm 15 is at the point P in FIG. 4B. The sinusoidal signal A is at about the maximum peak at the point P so that the changing rate is small, while the changing rate of the signal B is large there. It is therefore better to use the signal B at this point P to detect the rotational position of the arm 15 at high accuracy.

Figure 5:
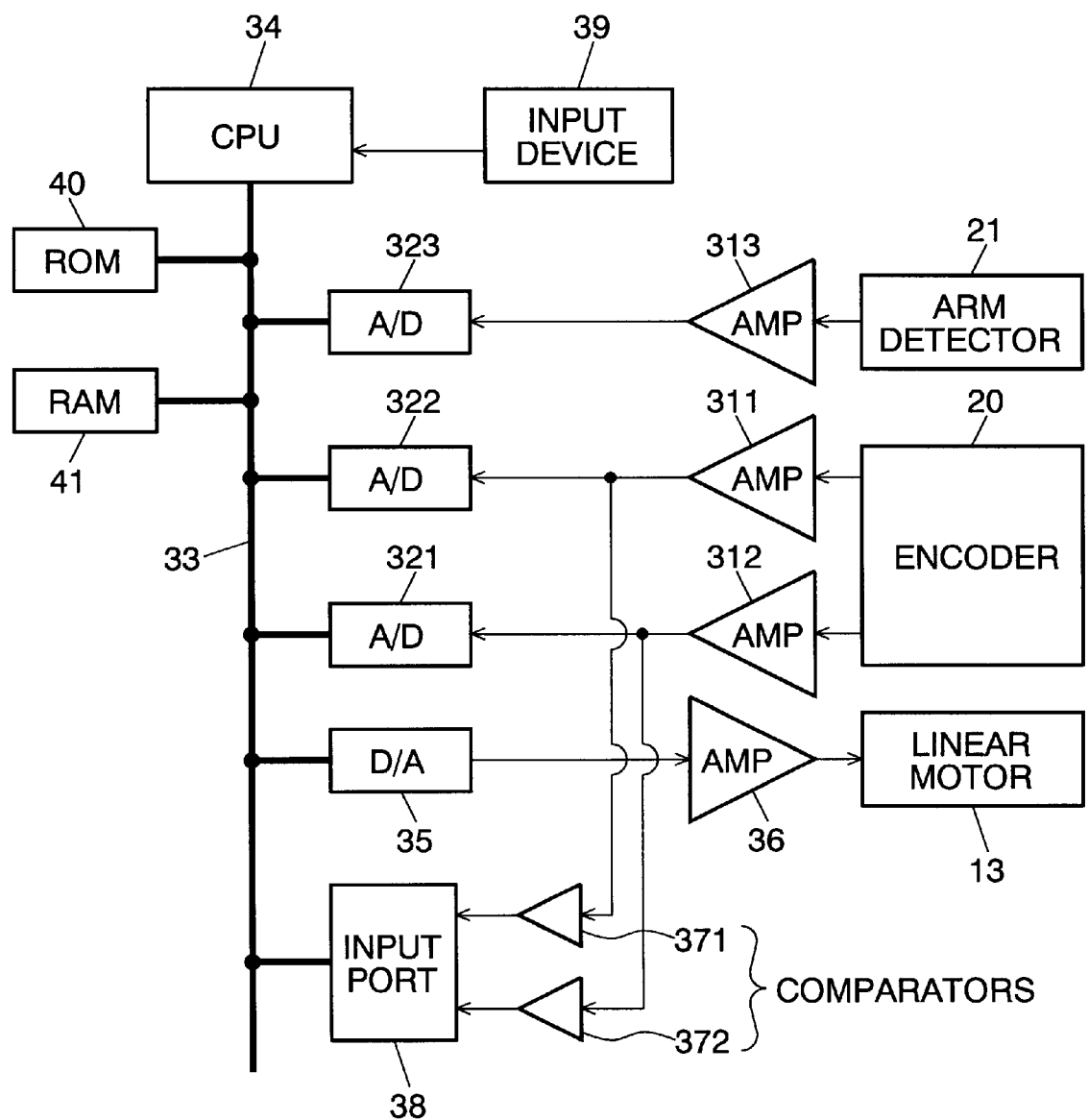
FIG. 5 is a block diagram showing the control system of the monochromator.

FIG. 5 shows a block diagram of the control system of the monochromator 10. The two sinusoidal signals A and B generated by the encoder 20 corresponding to a rotation of the arm 15 are adjusted by respective amplifiers 311 and 312 to signals of a preset magnitude of voltage. The signals are then converted by respective A/D converters 321 and 322 to respective digital data, which are sent to the CPU 34 through the bus 33. The output signal of the arm detector 21 is also sent to the CPU 34 through another amplifier 313, another A/D converter 323 and the bus 33. The CPU 34 processes the digital data sent through the A/D converters 321, 322, 323 to determine the rotational direction and the rotational position of the arm 15 as described above, and performs preset data processings based on the determined results. The CPU 34 then generates digital data representing a control value (voltage or polarity) for controlling the linear motor 13. The digital data generated by the CPU 34 is converted by a D/A converter 35 to an analog signal which is then adjusted by an amplifier 36 to another analog signal of a preset voltage. The signal is sent to the linear motor 13.

The CPU 34 controls the linear motor 13 in various ways depending on the type of the analyzing machine using the monochromator 10 and the object of the analysis. Here is described a case where the monochromator 10 is used in a spectrophotometer. As described before, a wavelength scanning analysis and a time course analysis can be performed in a spectrophotometer. An operator of the spectrophotometer operates an input device 39 to give a command to the CPU 34 designating which of the analyses are used. Corresponding to the kind of analysis designated by the operator, the CPU 34 processes and controls as follows. Necessary programs and data (such as representing the relationship between the rotational position of the arm 15 and the wavelength of the monochromatic light extracted by the monochromator 10) are stored in a ROM 40 and RAM 41 beforehand.

When designating the wavelength scanning analysis, the operator gives data representing the range of the wavelength to be scanned (i.e., the data of the minimum wavelength and the maximum wavelength of the range) to the CPU 34 using the input device 39. The CPU 34 performs a feedback control of the linear motor 13 as follows. Monitoring the rotational position of the arm 15 based on the output signals of the arm detector 21 and the encoder 20, the CPU 34 successively generates data of control values for controlling the linear motor 13 so that the rotational position of the arm 15 changes from the position corresponding to the minimum wavelength to that corresponding to the maximum wavelength (or vice versa) with a constant rotational speed. If the wavelength scanning is to be repeated plural times, the CPU 34 reverses the polarity of the voltage applied to the linear motor 13 when the arm 15 arrives at the position corresponding to the maximum wavelength (or the minimum wavelength).

When designating the time course analysis, the operator gives data representing the object wavelength to be used in the analysis to the CPU 34 through the input device 39. While detecting the position of the arm 15 based on the output signals of the arm detector 21 and the encoder 20, the CPU 34 generates data of a control value for driving the linear motor 13 to bring the arm 15 to the position corresponding to the object wavelength. When the arm 15 is detected to arrive the object rotational position, the CPU 34, while monitoring the output signal from the encoder 20, successively modifies the data of the control value for the linear motor 13 so that the output signal from the encoder 20 is maintained constant. Owing to the control by the CPU 34 to the linear motor 13, the arm 15 stays at the object rotational position. It is preferable to use the PID (proportional-integral-differential) control method in the feedback control of the linear motor 13, by which the rotational position of the arm 15 can be maintained with higher accuracy and stability.

When high accuracy is not necessary in controlling the rotational position or in controlling the rotational speed of the arm 15, it is possible to use only the information of the number of pulses among the information obtained from the sinusoidal signals A and B for determining the rotational position of the arm 15. Considering this possibility, a circuit is provided in the control system of FIG. 5 for obtaining the information of the pulse number from the output signal of the encoder 20. The circuit includes two comparators 371 and 372 each of which generates an output signal when the signal from a corresponding amplifier 311 or 312 reaches a preset level. The output terminal of the comparators 371 and 372 are connected to the terminals of an input port 38 provided to the bus 33. Based on the signal from the input port 38, the CPU 34 can detect an arrival of a pulse of the sinusoidal signal A or B. In this case where the rotational position of the arm 15 is determined based on the number of pulses, the data processing is simpler than the case where both the information of the pulse number and the information of the phase are used. The operator may give a command beforehand through the input device 39 to the CPU 34 whether the CPU 34 should use the signals from the A/D converters 321 and 322 or the signal from the input port 38. Alternatively, it is possible to predetermine to use the signals from the A/D converters 321 and 322 in a time course analysis and to use the signal from the input port 38 in a wavelength scanning analysis.

It should be noted that the above-described embodiment is a mere example and is not restrictive, and the present invention can be embodied in various ways within its spirit and scope. For example, the output signals generated by the encoder 20 are supposed to be sinusoidal in the above description. The waveform may be otherwise, such as a triangular one, as long as the waveform does not contain a flat portion. The encoder of the above embodiment is composed of a transmission window with the transmittance varying sinusoidally with respect to the position and a transmission type light sensor. Alternatively it is possible to compose the encoder with a reflection plate whose reflectance varies continuously and periodically with respect to the position and a reflection type light sensor. Instead of such photo type encoders, magnetic encoders or light interference encoders can be used in the present invention.

What is claimed is:

1. A monochromator comprising:
   a light dispersing element rotatable about an axis;
   a linear motor for rotating the light dispersing element around the axis;
   an encoder for generating a signal representing a rotational position of the light dispersing element, the signal having a waveform including no flat portion; and
   a controller for detecting the rotational position of the light dispersing element based on the signal generated by the encoder and for controlling the linear motor.

2. The monochromator according to claim 1 wherein the light dispersing element is mounted on an arm which is rotatable about the axis at one end and is driven by the linear motor.

3. The monochromator according to claim 2 wherein the encoder comprises a transmission window provided at the other end of the arm and a transmission type light sensor provided on a base of the monochromator where the transmittance of the transmission window varies continuously and cyclically with respect to the rotational position of the arm.

4. The monochromator according to claim 3 wherein the transmittance of the transmission window varies sinusoidally.

5. The monochromator according to claim 3 wherein the transmittance of the transmission window varies repeatedly triangular.

6. The monochromator according to claim 2 wherein the encoder comprises a reflection plate provided at the other end of the arm and a reflection type light sensor fixed to a base of the monochromator where the reflectance of the reflection plate varies continuously and cyclically with respect to the rotational position of the arm.

7. The monochromator according to claim 6 wherein the reflectance of the reflection plate varies sinusoidally.

8. The monochromator according to claim 6 wherein the reflectance of the reflection plate varies repeatedly triangular.

9. The monochromator according to claim 3 wherein the encoder generates two cyclic signals with a phase difference between the two signals, and the controller detects a rotational direction, as well as the rotational position, of the light dispersing element based on the two signals.

10. The monochromator according to claim 3 wherein the controller detects the rotational position of the light dispersing element based on the number of pulses of the signal generated by the encoder.

11. The monochromator according to claim 6 wherein the encoder generates two cyclic signals with a phase difference between the two signals, and the controller detects a rotational direction, as well as the rotational position, of the light dispersing element based on the two signals.

12. The monochromator according to claim 6 wherein the controller detects the rotational position of the light dispersing element based on the number of pulses of the signal generated by the encoder.

* * * * *